United States Patent [19]

Martin et al.

[11] Patent Number: 4,480,353
[45] Date of Patent: Nov. 6, 1984

[54] LEG SPLITTING MACHINE

[75] Inventors: Eugene G. Martin, New Holland; Harold C. Martin, Lancaster; Dale M. Risser, Denver, all of Pa.

[73] Assignee: FoodCraft Equipment Co., Inc., Lancaster, Pa.

[21] Appl. No.: 479,351

[22] Filed: Mar. 28, 1983

[51] Int. Cl.³ ............................................. A22C 21/00
[52] U.S. Cl. ........................................ 17/11; 17/12; 17/52
[58] Field of Search ......................... 17/11, 12, 52, 63

[56] References Cited

U.S. PATENT DOCUMENTS

| | | | |
|---|---|---|---|
| 3,514,809 | 6/1970 | Barbour et al. | 17/12 |
| 3,781,945 | 1/1974 | Taylor | 17/11 |
| 3,918,125 | 11/1975 | Strandine et al. | 17/45 |
| 4,091,503 | 5/1978 | Fox et al. | 17/11 |
| 4,207,653 | 6/1980 | Gasbarro | 17/11 |
| 4,306,335 | 12/1981 | Hawk et al. | 17/52 |

FOREIGN PATENT DOCUMENTS 1950739  4/1970  Fed. Rep. of Germany .......... 17/11

*Primary Examiner*—Willie G. Abercrombie
*Attorney, Agent, or Firm*—Price, Heneveld, Huizenga & Cooper

[57] ABSTRACT

A poultry leg splitting machine adapted to be employed either alone or in combination with a poultry leg/back processor wherein separated whole poultry legs comprised of the joined drumstick and thigh portions are delivered by a flited helical conveyor to a rotating slotted pocket wheel which in cooperative combination with fold-over guide rails automatically bends the drumstick-to-thigh ball-and-socket joint about the joint natural flex arc thereof across the slotted pocket wheel circumferential edge for angled slot blade severing of one set of distended joint side tendons thereby enabling the joint to pop under continued fold-over guide rail pressure and pocket wheel arcuate transport displacement thus permitting continued passage of the angled slot blade through joint tissue and remaining joint connecting tendons only without ball-and-socket joint bone contact to effect a completed transverse splitting of the poultry leg into separated thigh and drumstick cuts.

7 Claims, 8 Drawing Figures

LEG SPLITTING MACHINE

BACKGROUND OF THE INVENTION

The instant invention relates to a leg splitting machine for automatically effecting transverse severable knee joint separation of the lower and upper leg sections of a separated whole leg member of a small edible animal, and in particular poultry legs wherein the term poultry is used in a generic sense which would include but not necessarily be limited to old and young chickens, turkeys, ducks, and guineas. For simplicity in description and discussion of the invention hereof, however the particular poultry shown and referred to will be chicken.

It is further to be understood that the machine hereof may be employed separately but that the preferred use thereof in order to reduce handling and increase production efficiencies is in mechanically linked combination with a poultry leg/back processor generally of the type, but not necessarily limited to, that as shown and taught in presently pending U.S. patent application Ser. No. 265,636 (now U.S. Pat. No. 4,385,42) filed on May 20, 1981, by Eugene G. Martin, being a co-inventor herein.

At present, poultry processing operations and the machinery provided therefor evolve about the obtaining of an optimum balance between the capability and capacity for maximum net output and delivery of commercially and regulatory agency acceptable food product at a minimum labor cost factor. One of the controlling considerations as to both machinery and method in achieving an optimizing shift of balance to increased product output at a constant or reduced labor factor is whether or not the automated process method and machinery provided therefor is physically capable of handling the particular poultry section infeed component in a controlled manner at operational speed and effect section reducing cuts and dismemberment operations under controlled mechanical handling conditions to deliver reduced poultry pieces which are substantially free of either shattered or scraped bone fragment contamination.

Exemplary of modern methods and machinery provided to accomplish an optimum product output and labor factor balance as pertains to the instant invention disclosure would be that as taught by Hawk et al in their U.S. Pat. No. 4,306,335 dated Dec. 22, 1981, therein showing a machine having a part thereof adapted to receive the rear transverse bi-lateral halves of pre-sectioned poultry carcasses and thereafter reduce the same into smaller cut pieces by first severing the legs at the knee joints from the thighs and then longitudinally splitting the thighs for which purposes the Hawk et al machine employs rotating blade knife means.

Much of the handling control features provided by the machine of instant invention are obtained by the employment of an infeed assembly which embodies the use of filtered helix screw members in combination with guide and transfer bar means, the combined employment of which is not per se new in poultry processing operations since the functional features thereof in various structural combinations have been previously used to good advantage as taught by Barbour et al in U.S. Pat. No. 3,514,809 dated June 2, 1980, by Taylor in U.S. Pat. No. 3,781,945 dated Jan. 1, 1974, and by Strandine et al in U.S. Pat. No. 3,918,125 dated Nov. 11, 1975.

Some of the features of the instant invention have, in some respects, both structural and/or functional similarities to various of those teachings separately set forth in the prior art disclosures heretofor cited and briefly discussed. However, as will be hereinafter pointed out, the instant invention is distinguishable from said earlier inventions in one or more ways in that the present invention has utility features and new and useful advantages, applications, and improvements in the art of leg splitting machines not heretofore known.

SUMMARY OF THE INVENTION

It is the principal object of the present invention to provide a leg splitting machine adapted to receivably infeed sequentially a succession of separated whole poultry legs each of which is comprised of a joined drumstick and thigh and thereafter automatically and progressively effect knee joint natural flex arc bending and side tendon severing, popping the drumstick-to-thigh ball-and-socket knee joint, followed by completed severable transverse splitting of the drumstick from the thigh across said knee joint to respectively deliver therefrom a substantially bone fragment free thigh cut piece and a drumstick cut piece.

It is another object of the present invention to provide a leg splitting machine adapted to be employed in mechanically cooperative association with an existing poultry leg/back processing machine.

It is a further object of the present invention to provide a leg splitting machine for processing a separated whole poultry leg into a thigh cut piece and a drumstick cut piece without increased labor cost factors or additional manual handling operations of the poultry legs.

Still another object of the present invention is to provide a leg splitting machine adapted to be installed as original equipment in combination with a typical poultry leg/back processing machine.

It is yet another object of the present invention to provide a leg splitting machine which is mechanically simple and highly reliable in operation, safe and easily maintained, and capable of being operated by one not possessed of special skills or training.

Details of the foregoing objects and of the invention, as well as other objects thereof, are set forth in the following specification and illustrated in the accompanying drawings comprising a part thereof.

DETAILED DESCRIPTION OF THE INVENTION

Figure 1:
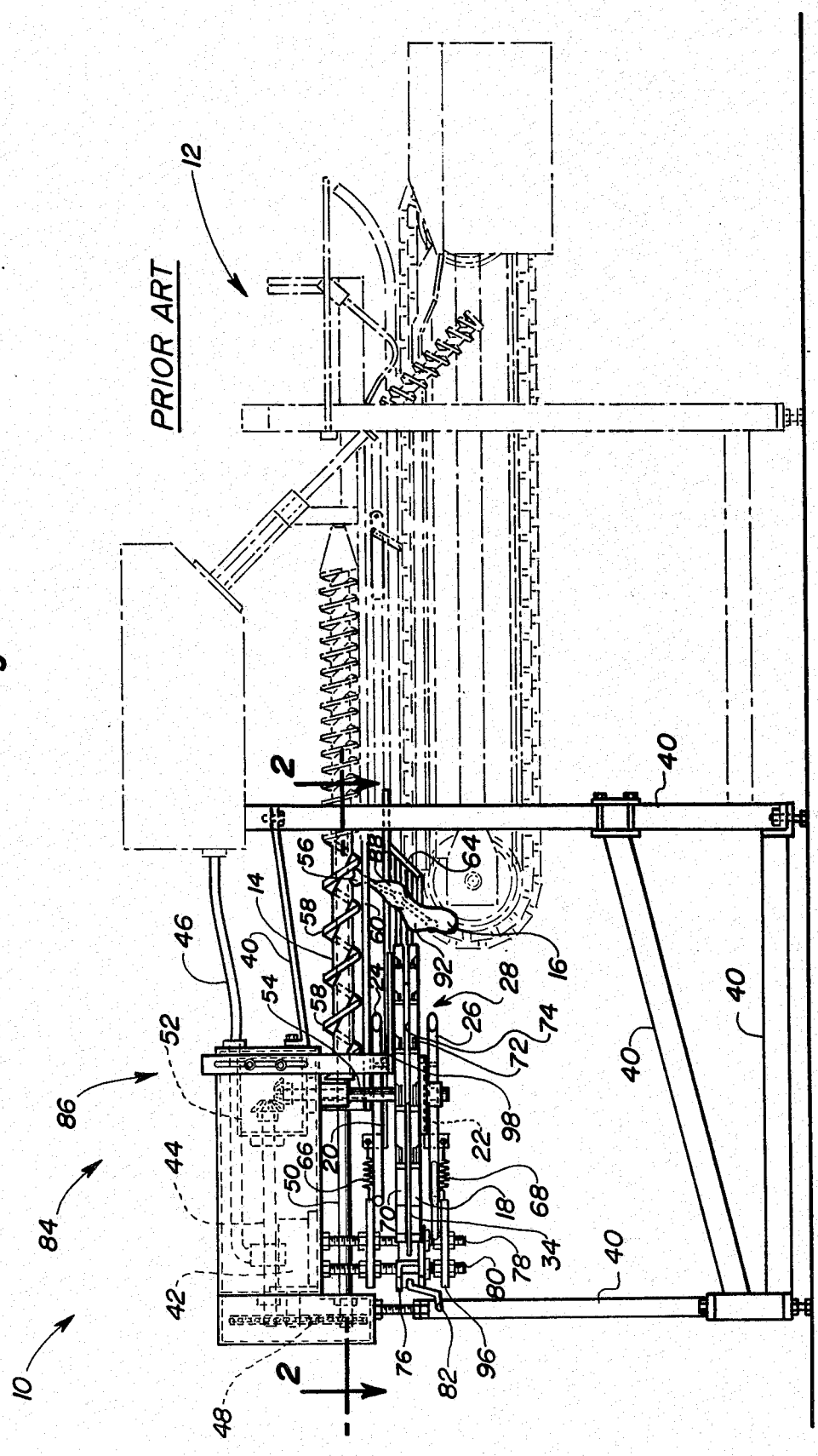
FIG. 1 is a side elevation view of the leg splitting machine comprising the instant invention, being shown installed as original equipment in combination with a typical prior art poultry leg/back processing machine.

Referring to FIG. 1, the leg splitting machine 10 of present invention is shown in the preferred embodiment thereof installed as original equipment in modification combination with a typical poultry leg/back processing machine 12, said invention 10 having as sub-assembly components thereof a spaced set of counterrotating flited helical conveyors 14 which respectively serve to receivably space and infeed deliver separated whole poultry legs 16 from the poultry leg/back processing machine 12 output end into a rotating slotted pocket wheel 18 and by means of the upper and lower spring loaded transfer arms 20 and 22 respectively thereby effect whole poultry leg 16 infeed pick-up by said rotating slotted pocket wheel 18 and by means of the cooperative upper drumstick fold-over guide rail 24 and the cooperative lower thigh fold-over guide rail 26 thereby effect flexed conforming of each such leg 16 within a pocket 28 of the plurality thereof provided in radial array spacing about said rotating slotted pocket wheel 18 with a resultant distending of each poultry leg knee joint 30 about the joint natural flex arc thereof in turn conformably about the slotted pocket wheel circumferential edge 32 prepatory to severable engagement thereof by the angled slot blade 34 whereby is accomplished a popping and progressive severable separation of the drumstick-to-thigh ball-and-sockrt knee joint tendon and tissue to the end of accomplishing an automatically completed transverse splitting thereof to respectively deliver a substantially bone fragment free thigh cut piece 36 and a drumstick cut piece 38 as more specifically hereinafter described on detailed consideration of FIGS. 3 through 8, wherein said machine 10 sub-assembly components are mounted and retained within a machine assembly support structure of horizontal and vertical members 40 and the rotating sub-assembly components thereof are powered by a hydraulic drive motor 42 which transmitts power thereto through a main drive shaft 44.

Referring again to FIG. 1 to describe in greater detail the component parts of this invention as well as explain generally the operational sequence thereof in accomplishing completed transverse splitting of a separated whole poultry leg 16 wherein it will be noted that said motor 44 is furnished with pressurized drive fluid through the hydraulic motor powering fluid line 46 which either draws pressurized hydraulic motor drive fluid from a house line, or, as shown, from the hydraulic power unit of another piece of equipment such as that of the poultry leg/back processing machine. As previously pointed out, the hydraulic drive motor main drive shaft 44 powers the machine 10 rotational units, and for that purpose is provided at one end thereof with a chain and sprocket drive transmission 48 which imparts rotary motion to the rotating flited helical conveyor mounting shaft 50 upon which in turn said flited helical conveyor 14 is assembled. At the main drive shaft end opposite the chain and sprocket drive transmission 48 end is assembled the rotating slotted pocket wheel right angle gear box transmission 52 which operates the rotating slotted pocket wheel drive shaft 54 whereby said slotted pocket wheel 18 is arcuately displaced rotationally in mechanically operational timing with the rotational infeed of separated whole poultry legs 16 by means of the rotating flited helical conveyor 14.

Infeed of separated whole poultry legs 16 is by successive engagement of the hock knuckles 56 thereof slidably and compressively between a rotating helical flite 58 of said flited helical conveyor 14 and the operator side elongated infeed guide retaining rail 60 of the spaced set of elongated infeed retaining rails 60 and 62, wherein said separated whole poultry leg 16 infeed may be either conducted as a manual operation when said machine 10 is employed for transverse leg splitting operations as a separate machine center, or by direct infeed transfer from a mechanically connected cooperative machine such as the poultry leg/back processor 12 as shown.

It will be noted that infeed of the separated whole poultry legs 16 is in a dangling or dependent freely swinging disposition as shown, and to further stabilize that configuration and to control the forward moving poultry leg 16 during infeed transit and just prior to and during pocket wheel transfer the infeed section is further provided with a depending leg stabilizing guide 64, which in turn further serves to prevent dependent swinging of infeed transport poultry legs 16 into contiguous apparatus when said machine 10 is employed in combination with other processing machinery or in multiple unit leg splitting machine processing assemblies to be hereinafter more fully detailed and described.

As an infeed separated whole poultry leg 16 is transported by the rotating flited helical conveyor 14 in dangling slidable suspension by the hock knuckle 56 thereof upwardly between the elongated infeed guide retaining rails 60 and 62 each such leg 16 moves past the ends of the upper drumstick fold-over guide rail 24 and the lower thigh fold-over guide rail 26 and into simultaneous spring-resistance slidable and guidable contact with the upper spring loaded transfer arm 20 and the lower spring loaded transfer arm 22 with concurrent timed arcuate displacement of one of the pockets 28 of the rotating slotted pocket wheel 18 to engagably transfer receive thereto said leg 16 and thereafter initiate the natural flex arc bending of the knee joint 30 about the slotted pocket wheel circumferential edge 32 by fold-over slidable engagement of the drumstick and thigh respectively with the upper drumstick fold-over guide rail 24 and the lower thigh fold-over guide rail 26, all as more specifically shown and described on detailed consideration of subsequent FIGS. 3 through 8 hereinafter. It is by the foregoing mechanically cooperative sequence, however, that transfer of the legs 16 from the rotating flited helical conveyor 14 to the rotating slotted pocket wheel 18 is effected and initiation of leg bending for accomplishment of subsequent severable transverse splitting thereof across the respective leg knee joints 30, takes place. Also shown in FIG. 1 is the upper transfer arm spring 66 and the lower transfer arm spring 68 which may or may not be of the same weight and spring force depending on the relative handling characteristics of the particular legs 16 being processed.

It will be noted that the rotating slotted pocket wheel 18 is not only provided with a plurality of pockets 28 at regularly repeating arcuate displacement distances about the circumference thereof, but also has a vertical structure which provides an upper wheel sheave 70 and a lower wheel sheave 72 with a uniform spaced slot 74 therebetween which is that slot within which the angled slot blade 34 is adjustably positioned and operates. The angled slot blade 34 is assembled within an angularly adjustable slot blade mounting bracket 76 in turn assembled upon threaded blade pivot shaft 78 and threaded bracket pivot shaft 80 all of which is operable by means of hand crank 82 to adjust and set and maintain the operational position of said angled slot blade 34 within said slot 74 whereby severable transverse splitting of said legs 16 respectively across the leg knee joints 30 thereof is accomplished.

Preferably, the poultry leg splitting machine hereof as illustrated and described in consideration of FIG. 1 is constructed of corrosive resistant metal alloys and plastics such as stainless steel and the trade-named product known as Teflon, but any other suitable materials or combinations thereof may be used.

Figure 2:
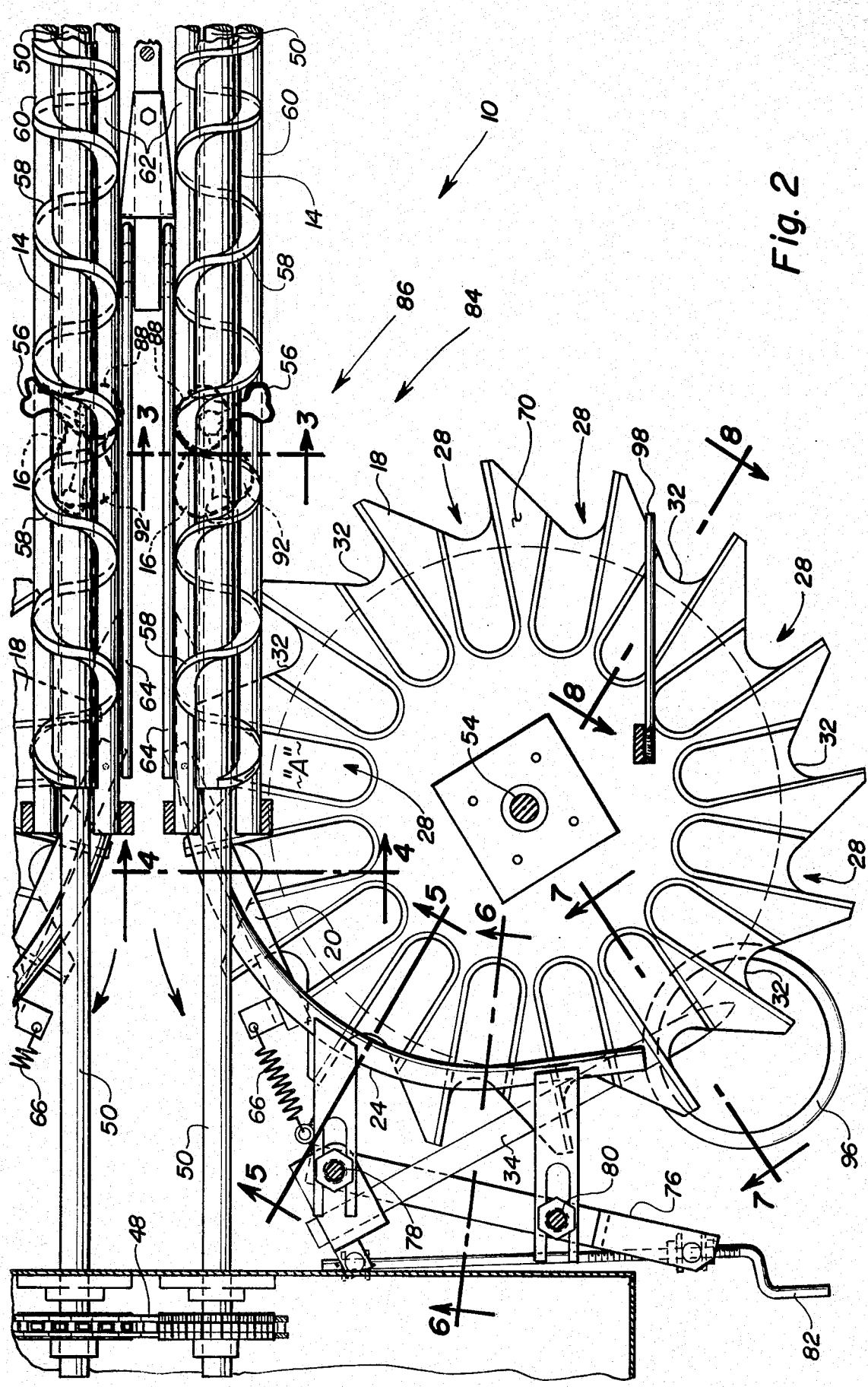
FIG. 2 is an enlarged top plan view of a poultry leg splitting machine processing component embodying the features of the instant invention as shown in FIG. 1 and seen along the line 2—2 thereof.

Referring now to FIG. 2 to consider in greater detail structural features of said machine 10, and in particular the multiple unit leg splitting machine processing assembly 84 embodiment thereof, which is that version as appears in FIG. 1 but which is more apparent in the fragmentary enlarged top plan view thereof as shown in FIG. 2. It will be noted that a leg splitting machine 10 processing unit 86 is that assembly embodying as operational components thereof a rotating flited helical conveyor 14 with a rotating slotted pocket wheel 18 plus the angled slot blade 34 and the various guide and fold-over rail means therewith to accomplish severable transverse leg splitting generally as described above and to be described in greater detail hereinafter. As shown in FIG. 2, however, since the poultry leg/back processing machine 12 with which said leg splitting machine 10 is employed in combination delivers separated whole poultry legs 16 from both sides thereof, said machine 10 embodies as operational components thereof two processing units 86 arranged to mechanically receive separated whole poultry leg output from either side of said leg/back processing machine 12 as successive infeed to the rotating flited helical conveyors 14 for subsequent transfer therefrom to the respective rotating slotted pocket wheels 18 operational therewith, wherein each of said processing units 86 comprising the multiple unit leg splitting machine processing assembly 84 of instant consideration counterrotates one with respect to the other but, however in all other respects each is mechanically and operationally identical to the other. The point is, that no matter how many processing units 86 comprise a machine 10, whether a single unit 86 or a multiple unit processing assembly 84, and whether or not counterrotating, they all have the same structure and operate as generally described above and as described in detail hereinafter.

Figure 3:
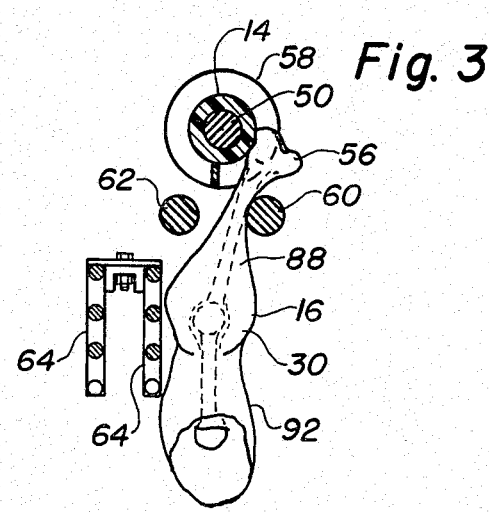
FIG. 3 is an end elevation view of a typical separated whole poultry leg in the process of infeed transport by means of the flited helical conveyor of said machine as shown in FIG. 2 and seen along the line 3—3 thereof.

Considering in detail now the operational sequence in employing said machine 10 in accomplishing severable transverse splitting of separated whole poultry legs 16 into a thigh cut piece 36 and a drumstick cut piece 38. The end elevation view shown in FIG. 3 is exemplary of the separated whole poultry leg 16 dangling slidable infeed disposition after forward transport engagement by the flited helical conveyor 14 as retained by means of the hock knuckle 56 thereof between with the operator side elongated infeed guide retaining rail 60 and stabilized in forward dangling movement by engagement slidably with the depending leg stabilizing guide 64. In the aforedescribed disposition each of the legs 16 of a sequentially infed succession thereof are staged for transfer from a dangling spaced lineal displacement transport by the rotating flited helical conveyor 14 to a corresponding tensioned fold-over arcuate spaced rotary displacement transport by the rotating slotted pocket wheel 18.

Figure 4:
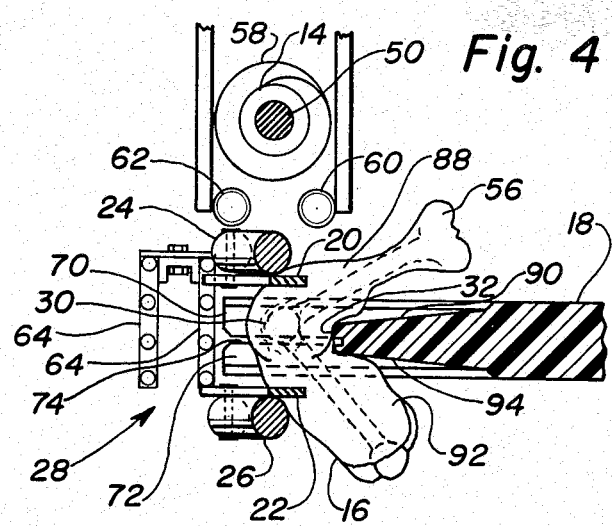
FIG. 4 is an end elevation view of the transfer of a typical separated whole poultry leg from the flited helical conveyor to the rotating slotted pocket wheel of said machine as the same would appear in FIG. 2 when seen along the line 4—4 thereof.

The point of simultaneous transitory leg 16 engagement by the rotating flited helical conveyor 14 and the rotating slotted pocket wheel 18 is pocket 28 position "A" as shown in FIG. 2, and the end elevation view of said leg 16 as shown in FIG. 3 is the relative disposition thereof just prior to such transitory transfer engagement and the end elevation view of said leg 16 as shown in FIG. 4 is the relative disposition thereof just after such transitory transfer engagement by said rotating slotted pocket wheel 18. More specifically, the view shown in FIG. 4 illustrates initiation of leg bending at the knee joint 30 about the natural flex arc thereof by knee crotch supportable engagement contact with the slotted pocket wheel circumferential edge 32 and a reflexive bending of the drumstick segment 88 thereabout into the upper wheel sheave pocket recess 90 as a consequence of resistance contact with the upper spring loaded transfer arm 20 with a simultaneous cooperative reflexive bending of the thigh segment 92 also about said circumferential edge 32 into the lower wheel sheave pocket recess 94, all prepatory to slidable engagement of said drumstick segment 88 and thigh segment 92 respectively by the upper drumstick fold-over guide rail 24 and the lower thigh fold-over guide rail 26.

Figure 5:
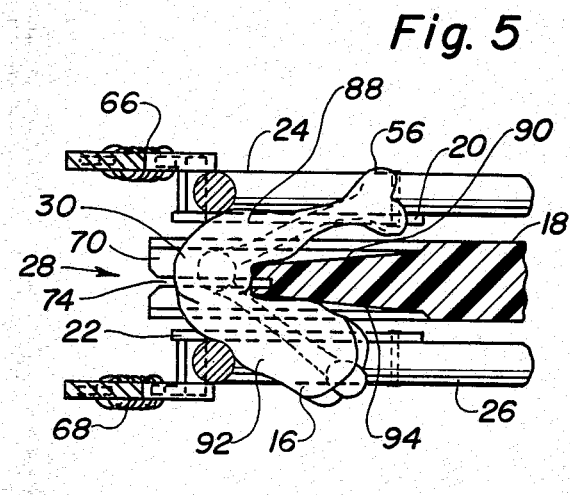
FIG. 5 is an end elevation view of the fold-over bending of a typical separated whole poultry leg through the knee joint natural flex arc thereof for processing retainment within a pocket of the rotating slotted pocket wheel of said machine as the same would appear in FIG. 2 when seen along the line 5—5 thereof.

The illustration shown in FIG. 5 is an end elevation view exemplifying full transfer control of a leg 16 by the rotating slotted pocket wheel 18 which in terms of relative arcuate rotary transport displacement disposition thereby corresponds to that as in turn shown in the FIG. 2 top plan view along the line 5—5 thereof. As shown in FIG. 5, a continued natural flex arc bending of said leg 16 progresses about the knee joint 30 thereof by slidable transfer engagement of the drumstick and thigh segments 88 and 92 respectively from spring resistance contact with the upper and lower spring loaded transfer arms 20 and 22 respectively to solid contact with the upper drumstick and lower thigh fold-over guide rails 24 and 26 whereby distension of the leg knee joint tendons and tissue is commenced prepatory to transverse severing thereof.

Figure 6:
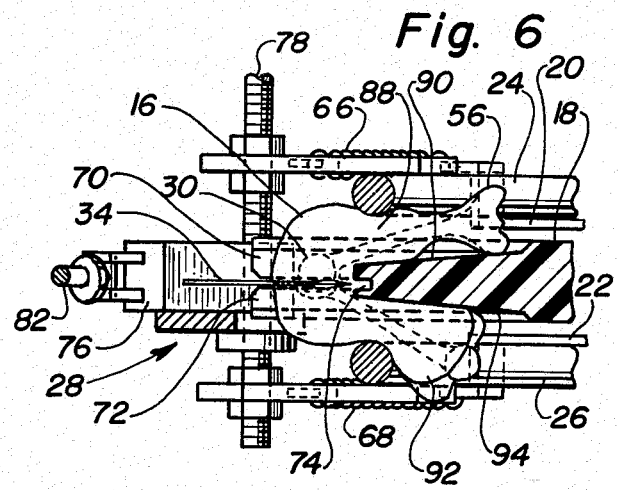
FIG. 6 is an end elevation view of the angled slot blade initial tendon severing of the drumstick-to-thigh ball-and-socket bent knee joint of a typical separated whole poultry leg during retainably held arcuate displacement transport thereof within a pocket of said rotating slotted pocket wheel as the same would appear in FIG. 2 when seen along the line 6—6 thereof.

The view shown in FIG. 6 illustrates fully bent natural flex distension of the leg 16 knee joint 30 about the slotted pocket wheel circumferential edge 32 by means of upper drumstick fold-over guide rail 24 compressive engagement of the drumstick segment 88 within the upper wheel sheave pocket recess 90 and the lower thigh fold-over guide rail 26 compressive engagement of the thigh segment 92 within the lower wheel sheave pocket recess 94 such that the angled slot blade 34 first severably engages and cuts the knee joint 30 side tendons thereby enabling said joint 30 to pop open and enable continued severable passage of said blade 34 through the joint tissue between the ball-and-socket drumstick and thigh bone ends upon continued arcuate displacement of said rotating slotted pocket wheel 18.

Figure 7:
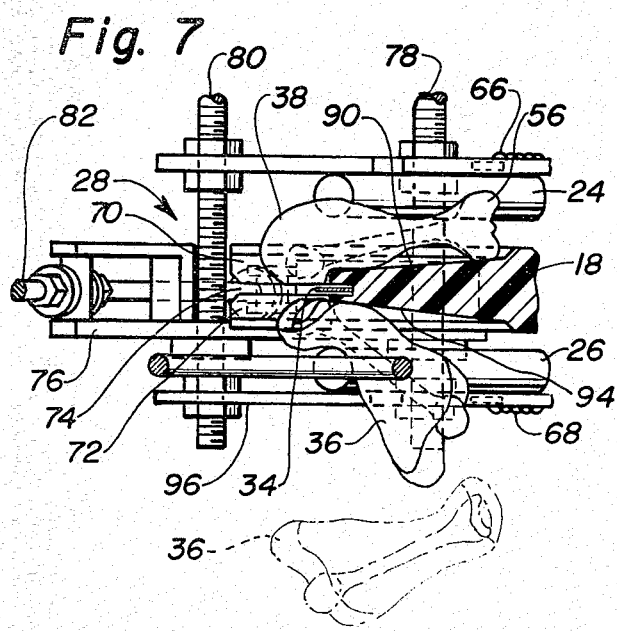
FIG. 7 is an end elevation view of the completion of transverse splitting of a typical separated whole poultry leg across the popped drumstick-to-thigh ball-and-socket bent knee joint and thigh cut discharge delivery as the same would appear in FIG. 2 when seen along the line 7—7 thereof.

The view shown in FIG. 7 illustrates the completed transverse leg splitting to provide a thigh cut piece 36 and a drumstick cut piece 38, wherein also is shown the thigh cut piece 36 delivery discharge by means of the thigh discharge bar 96 which is positioned to engage and knock the thigh cut piece 36 out of the lower wheel sheave pocket recess 94 during continued arcuate transport displacement of said rotating slotted pocket wheel 18.

Figure 8:
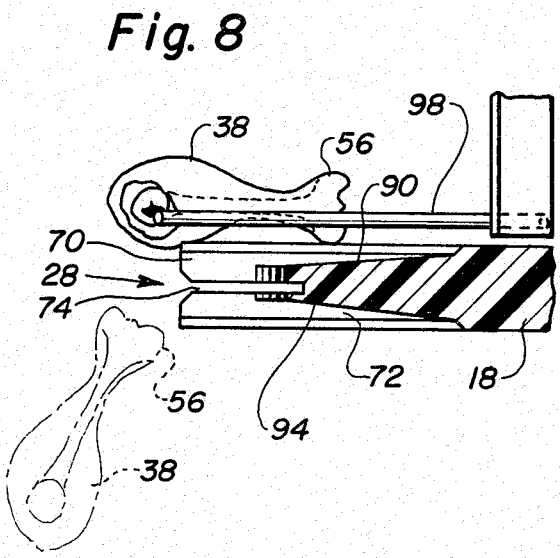
FIG. 8 is an end elevation view of the drumstick cut discharge delivery from said machine as the same would appear in FIG. 2 when seen along the line 8—8 thereof.

Considering lastly the view shown in FIG. 8 which illustrates completion of the leg splitting cycle upon slotted pocket wheel 18 arcuate displacement to effect delivery discharge of the drumstick cut piece 38 by engagement contact thereof with the drumstick discharge bar 98, which rotating slotted pocket wheel 18 arcuate displacement position corresponds to that as shown in the top plan view of FIG. 2 at the line 8—8 thereof.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

We claim:

1. A leg splitting machine adapted to receivably infeed thereto a succession of separated whole poultry legs and thereafter automatically process the same to deliver therefrom as reduced pieces a thigh cut and a drumstick cut, said leg splitting machine comprising in combination:
   a. a support frame structure having interconnected vertical and horizontal members,
   b. at least one rotating flited helical conveyor infeed shaft with a spaced set of elongated infeed guide retaining rails in turn adjustably positioned in depending underlying spaced relationship relative to said rotating flited helical conveyor infeed shaft wherein the respective axes of said shaft and said rails are parallel one to the other,
   c. at least one rotating slotted pocket wheel having an upper wheel sheave and a lower wheel sheave with a uniform spaced slot therebetween and provided with a plurality of pocket means radially spaced at regularly repeating arcuate displacements circumferentially about the edge of said wheel said pocket means adapted to receivably support respectively therein a separated whole poultry leg in a bent configuration described about the natural flex arc of the drumstick-to-thigh ball-and-socket knee joint thereof,
   d. a set of fold-over guide rail means in adjustable spaced relationship to said wheel and adapted to slidably receive and maintain said separated whole poultry leg in said bent configuration in said pocket means during arcuate displacement transport thereof by said wheel,
   an angled slot blade adjustably disposed within said spaced slot and positioned to separably sever sequentially and respectively each drumstick-to-thigh ball-and-socket knee joint of each separated whole poultry leg maintained in said bent configuration during arcuate displacement transport thereof by said wheel into engagement with said angled slot blade, and
   f. a power to impart mechanically cooperative timed rotational motion to said rotating flited helical conveyor infeed shaft and said rotating slotted pocket wheel.

2. The leg splitting machine according to claim 1 in which each of said pocket means is comprised of a spaced set of cooperative recesses with one each recess of said set respectively in said upper wheel sheave and said lower wheel sheave.

3. The leg splitting machine according to claim 2 in which each of said fold-over guide rail means of said set is provided with a spring resistanced transfer arm operable to effect separated whole poultry leg controlled discharge from said rotating flited helical conveyor and infeed transfer loading thereof into said rotating slotted pocket wheel.

4. A leg splitting machine in cooperative communicating combination with a poultry leg/back processing machine and adapted to receivably infeed from said poultry leg/back processing machine automatically a succession of separated whole poultry legs and thereafter in turn automatically process the same to deliver therefrom as reduced pieces a thigh cut and a drumstick cut, said leg splitting machine comprising in combination:
   a. a support frame structure having interconnected vertical and horizontal members adapted to mchanically interconnect to said poultry leg/back processing machine.
   b. a plurality of rotating flited helical conveyor infeed shafts wherein each of said shafts respectively is provided with a spaced set of elongated infeed guide retaining rails in turn adjustably positioned in underlying spaced relationship relative to each of said rotating flited helical conveyor infeed shafts wherein the respective axes of said shafts and said rails are parallel one to the other,
   c. a plurality of rotating slotted pocket wheels corresponding in number to said plurality of rotating flited helical conveyor infeed shafts wherein each of said rotating slotted pocket wheels has an upper wheel sheave and a lower wheel sheave with a uniform spaced slot therebetween and provided with a plurality of pocket means radially spaced at regularly repeating arcuate displacements circumferentially about the edge of said wheel and pocket means and adapted to receivably support respectively therein a separated whole poultry leg in a bent configuration described about the natural flex arc of the drumstick-to-thigh ball-and-socket knee joint thereof,
   d. a set of fold-over guide rail means for each of said rotating slotted pocket wheels of said plurality thereof and positioned respectively thereto in adjustable spaced relationship and adapted to slidably receive and maintain said separated whole poultry leg in said bent configuration in said pocket means during arcuate displacement transport thereof by said pocket wheel,
   e. a plurality of angled slot blades corresponding in number to said plurality of rotating slotted pocket wheels wherein each blade of said plurality is adjustably disposed within said spaced slot of said pocket wheel and therein positioned to separably sever sequentially and respectively each drumstick-to-thigh ball-and-socket knee joint of each separated whole poultry leg maintained in said bent configuration during arcuate displacement transport thereof by said wheel into engagement with said angled slot blade, and f. a power means to impart mechanically cooperative timed rotational motion with respect to said poultry leg/back processing machine to said plurality of rotating flited helical conveyor infeed shafts and said plurality of rotating slotted pocket wheels corresponding thereto.

5. The leg splitting machine according to claim 4 in which the number comprising the number of flited helical conveyor infeed shafts corresponds to the number of separated whole poultry leg delivery stations of said poultry leg/back processing machine.

6. The leg splitting machine according to claim 5 in which each of said pocket means is comprised of a spaced set of cooperative recesses with one each recess of said set respectively in said upper wheel sheave and said lower wheel sheave.

7. The leg splitting machine according to claim 6 in which each of said fold-over guide rail means of a set thereof is provided with a spring resistanced transfer arm operable to effect separated whole poultry leg controlled discharge respectively from each of said rotating flited helical conveyors and infeed transfer loading thereof to said corresponding rotating slotted pocket wheel.

* * * * *